United States Patent [19]

McKeown

[11] Patent Number: 4,561,067
[45] Date of Patent: Dec. 24, 1985

[54] MULTI-CHANNEL CROSS-TALK INTERFERENCE REDUCTION CIRCUIT USING MODULATION-MULTIPLYING-DEMODULATION CORRELATOR

[75] Inventor: James H. A. McKeown, Ipswich, England

[73] Assignee: British Telecommunications, London, England

[21] Appl. No.: 502,755

[22] Filed: Jun. 9, 1983

[30] Foreign Application Priority Data

Jun. 23, 1982 [GB] United Kingdom ............... 8218166

[51] Int. Cl.⁴ .......................... G06G 7/19; H04B 15/00
[52] U.S. Cl. ................................. 364/819; 343/378; 455/305
[58] Field of Search ............. 364/800, 807, 819–824, 364/728, 604; 375/94, 96, 99–102; 455/296, 303, 305–306, 309, 312; 343/378, 382–384; 371/67–68

[56] References Cited

U.S. PATENT DOCUMENTS

| 3,197,625 | 7/1965 | Ratz | 364/819 X |
| 3,479,495 | 11/1969 | Malm | 364/819 X |
| 3,483,549 | 12/1969 | Gutleber | 364/819 X |
| 3,518,415 | 6/1970 | Gutleber | 364/819 X |
| 3,519,746 | 7/1970 | Gutleber | 364/819 X |
| 3,963,990 | 6/1976 | DiFonzo | 455/305 X |
| 4,008,439 | 2/1977 | Schroeder | 455/303 X |
| 4,122,393 | 10/1978 | Gordy et al. | 375/96 X |
| 4,149,121 | 4/1979 | Gordy et al. | 375/96 X |
| 4,179,658 | 12/1979 | Bitzer | 375/96 X |
| 4,214,244 | 7/1980 | McKay et al. | 343/384 X |
| 4,245,326 | 1/1981 | Gutleber | 343/378 X |
| 4,253,189 | 2/1981 | Lemoussu et al. | 375/96 X |
| 4,283,767 | 8/1981 | Rountree | 364/819 X |

Primary Examiner—Gary V. Harkcom
Attorney, Agent, or Firm—Cushman, Darby & Cushman

[57] ABSTRACT

A circuit for cancelling unwanted components in two received signals has a first input for one of the signals and a second input for the other. The first input is connected by a first circuit path to an output and the second input by a second circuit path to an output. Each circuit path has an associated feedback which includes a correlating device which is arranged to receive fractions of both output signals. Each correlating device forms a control signal which is applied to a mixer. Each mixer operates under the control of the control signal to feed to its associated circuit path a signal which tends to cancel the unwanted component.

15 Claims, 3 Drawing Figures

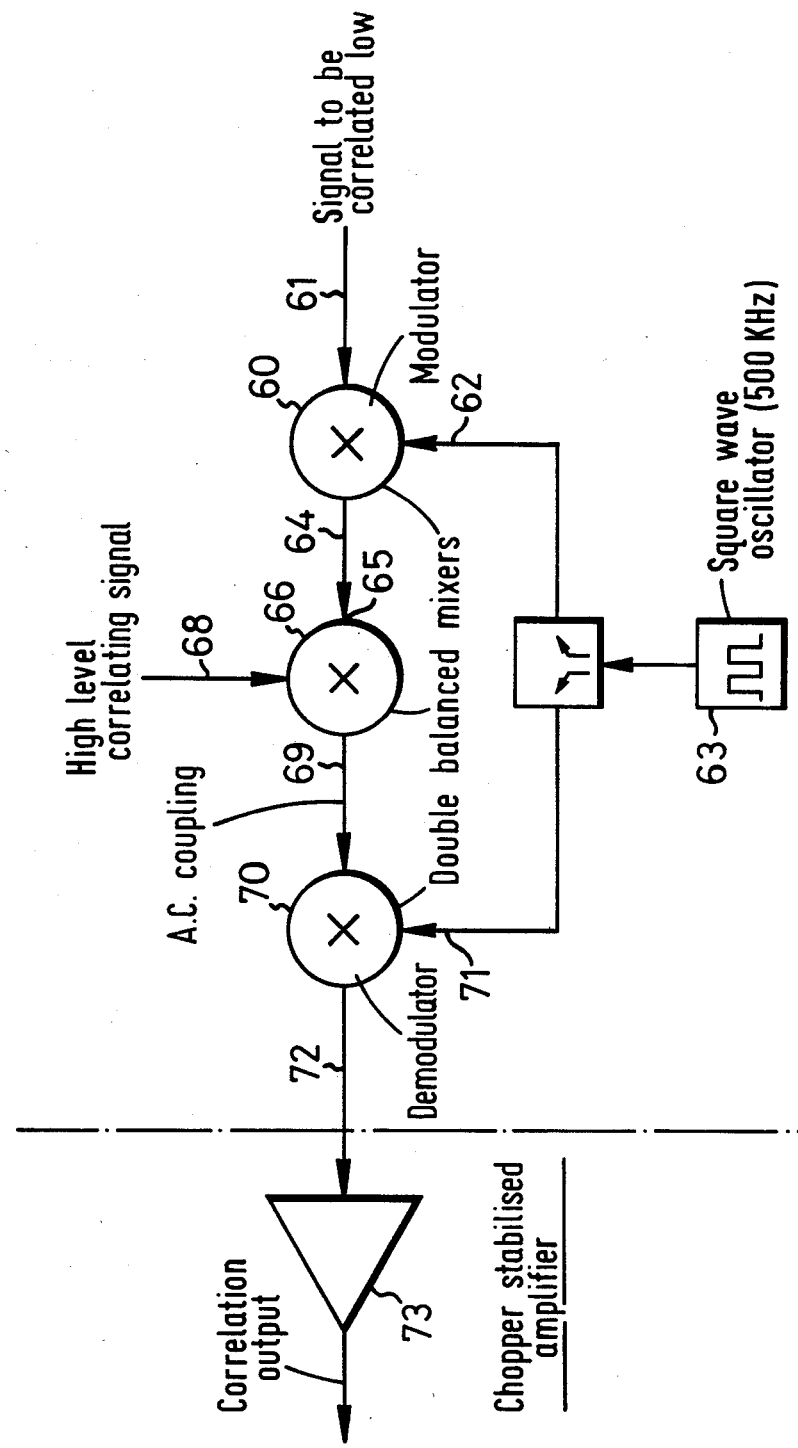

MULTI-CHANNEL CROSS-TALK INTERFERENCE REDUCTION CIRCUIT USING MODULATION-MULTIPLYING-DEMODULATION CORRELATOR

BACKGROUND OF THE INVENTION

This invention relates to the cancellation or reduction of unwanted components in received signals. In particular the invention relates to the cancellation or reduction of unwanted components in two received signals each of which includes a component of the other.

In radio systems such as microwave links, receiving equipment is sometimes required to receive two or more signals each of which includes a component of one or more of the others. In order to process the received signals it is necessary to cancel or substantially reduce these unwanted components. The present invention is concerned with a circuit for cancelling or reducing these unwanted components.

SUMMARY OF THE INVENTION

According to one aspect of the present invention there is provided an electrical circuit for receiving two or more input signals each of which includes a component of one or more of the others, the circuit being arranged to cancel or substantially reduce said components in each signal. The circuit includes a first input coupled by a first circuit path for a first of said input signals to a first output, a second input coupled by a second circuit path for a second input signal to a second output, a feedback loop associated with each circuit path, each feedback loop having correlation means arranged to receive fractions of both output signals. The correlation means is arranged to form a control signal which is fed to a further circuit, said further circuit being operative in accordance with said control signal to feed to the circuit path associated with the feedback loop a signal which tends to cancel the unwanted component. Each correlation means many comprises a multiplying means followed by an integrator, said multiplying means comprising modulation means for modulating a first of the signals to be correlated with a preselected signal, a multiplier for multiplying the modulated signal with the second of the signals to be correlated and demodulating means for demodulating the multiplied signal.

Each further circuit may comprise a complex attenuator which is arranged to receive a fraction of the signal received at the input associated with the other feedback loop and to adjust the magnitude and phase of this signal so as to cancel the unwanted component.

The integrator may comprise a chopper stabilised amplifier.

Each circuit path may include a first splitting circuit for splitting each received signal into two parts, one of which is fed to a combining circuit and the other which is fed to the correlation means of the feedback loop associated with the other received signal. Each combining circuit may be arranged to receive the output signal of its associated complex attenuator and to combine that output signal with the signal received from said first splitting circuit. Each circuit path may include a second splitting circuit arranged to receive output signals from said combining circuit, said second splitting circuit being arranged to produce output signals for feeding to the correlation means of each feedback loop.

Each circuit path may include an automatic gain control circuit for stabilising the level of the signal strength at each output.

The invention also provides an improved correlation circuit which can be used in the circuit of said one aspect. A conventional correlation circuit for correlating high and low level signals comprises a double-balanced mixer in which a high level signal is used to switch diodes. Imperfections in the double balanced mixer give rise to a DC offset voltage at the output which is related to the high level input signal. This DC offset voltage will cause an error in the control signal to the complex attenuators and will reduce the efficacy of the cancellation process. We have devised a correlation circuit in which this problem is reduced.

According to a second aspect of the present invention there is provided a correlation circuit for correlating first and second signals, said circuit comprising modulation means for modulating the first signal with a preselected signal, multiplying means for multiplying the modulated signal with the second signal, and demodulating means for demodulating the multiplied signal. The modulating frequency can be substantially lower than the frequency of said first and second signals. The effect is a frequency conversion to lower frequencies with a consequent reduction in the leakage problems.

BRIEF DESCRIPTION OF THE DRAWINGS

The invention will be described now by way of example only with particular reference to the accompanying drawings. In the drawings:

FIG. 3 is a schematic diagram illustrating a correlator which can be used in the canceller shown in FIGS. 1 and 2.

DESCRIPTION OF THE PREFERRED EMBODIMENTS

Figure 1:
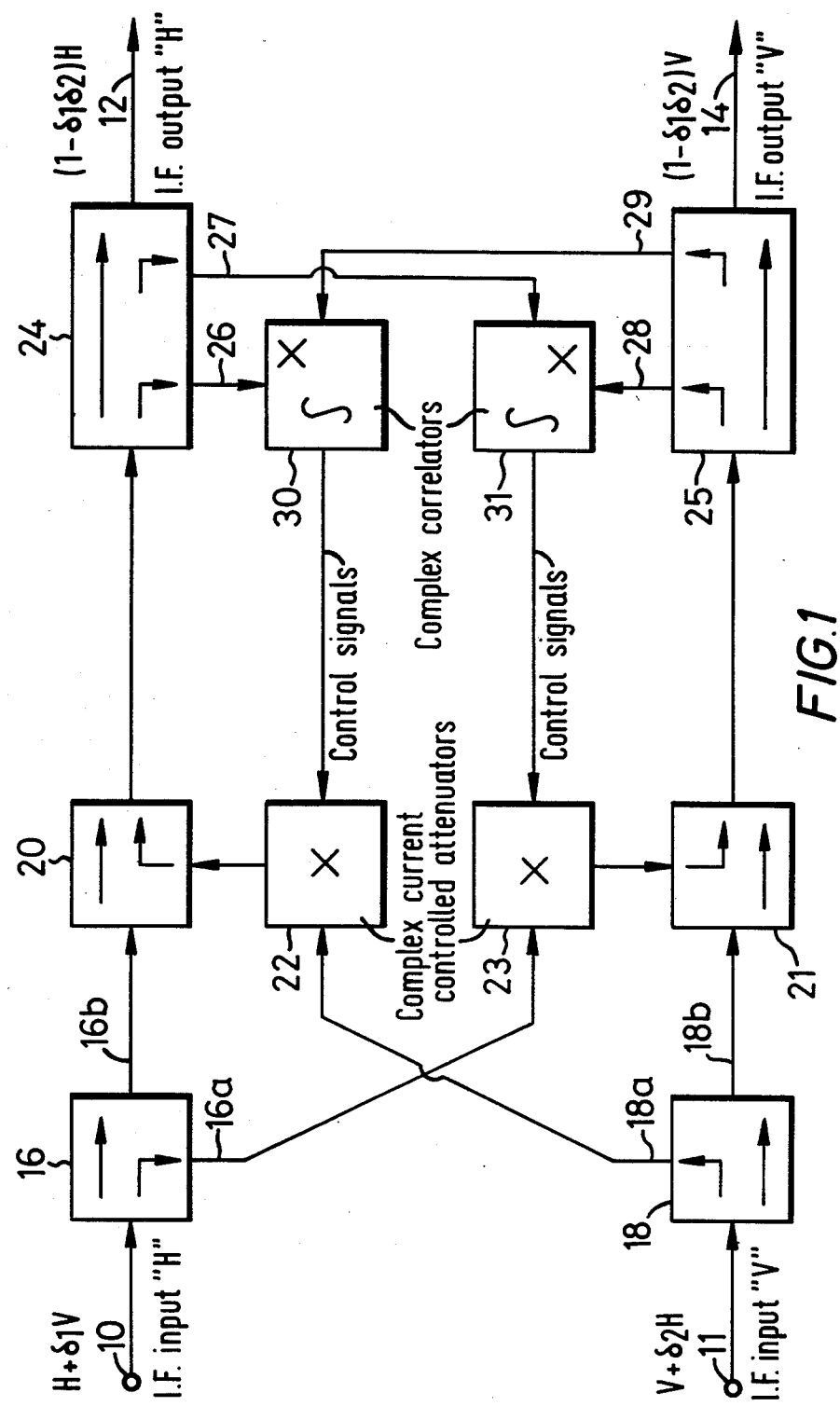
FIG. 1 is a block schematic diagram illustrating an intermediate frequency canceller in accordance with the present invention.

Referring to FIG. 1 of the drawings an intermediate frequency canceller has two inputs 10, 11. The input 10 is arranged to receive a first input signal and the input 11 is arranged to receive a second input signal. The first input signal is designated $H + \delta_1 V$ in FIG. 1 and the second signal is designated $V + \delta_2 H$. It will be seen that the signal H contains a component $\delta_1 V$ of the signal V and the signal V includes a component $\delta_2 H$ of the signal H. The purpose of the circuit shown in FIG. 1 is to reduce or substantially remove the components $\delta_1 V$ and $\delta_2 H$ so that the output signal at output 12 contains only signal H and the output signal at output 14 contains only signal V.

Each input 10, 11 is connected to a splitting circuit 16 and 18. Each splitting circuit is arranged to split the received signal into two parts, one part being fed to a combining circuit 20, 21 and the other being fed to complex attenuators 22, 23. Each combining circuit 20, 21 is connected to a further splitting circuit 24, 25, one output of the splitting circuit 24 being the output 12 and one output of splitting circuit 25 being the output 14. Each splitting circuit has two further outputs designated 26, 27 and 28, 29. The output 26 is connected to the complex attenuator 22 by a feedback loop which includes a complex correlator 30 whilst the output 28 of the splitting circuit 25 is connected to complex attenuator 23 by a feedback loop which includes a complex correlator 31. The output 27 of the splitting circuit 24 is connected to the correlator 31 in the feedback loop associated with the circuit path for the signal V whilst the output 29 of splitting circuit 25 is connected to the correlator 30 in the feedback loop associated with the circuit path for signal H.

In operation the correlator 30 receives an output signal from the output 26 of the splitting circuit 24 and multiplies that signal with the output signal received from the output 29 of the splitting circuit 25. The multiplied signal is integrated and then applied as a control signal to the complex attenuator 22. The complex attenuator 22 receives a signal from the splitter 18 and the effect of the control signal applied from the correlator 30 is such that the complex attenuator 22 applies to the combining device 20 a signal which tends to cancel the component $\delta_1 V$ in the signal $H + \delta_1 V$. The resulting output signal at the output 12 of the splitting circuit 24 is $(1 - \delta_1 \delta_2)H$.

The correlator 31 in the feedback loop associated with the signal path of the signal V operates in a similar manner. The correlator 31 provides a control signal for the complex attenuator 24 so that the complex attenuator applies to the combining circuit 21 a signal which tends to cancel the component $\delta_2 H$ in the signal $V + \delta_2 H$. The resulting output from the splitting circuit is $(1 - \delta_1 \delta_2)V$.

It will be appreciated that FIG. 1 is a schematic representation of a canceller constructed in accordance with one embodiment of the present invention. The component parts of the canceller can be conventional devices which will be known to those skilled in the art. For example the splitting circuits 16 and 18 and the combining circuits 20 and 21 can be conventional hybrid devices. The mixers 22 and 23 can be double balanced mixers. The correlators 30 and 31 will be described in more detail below.

Figure 2:
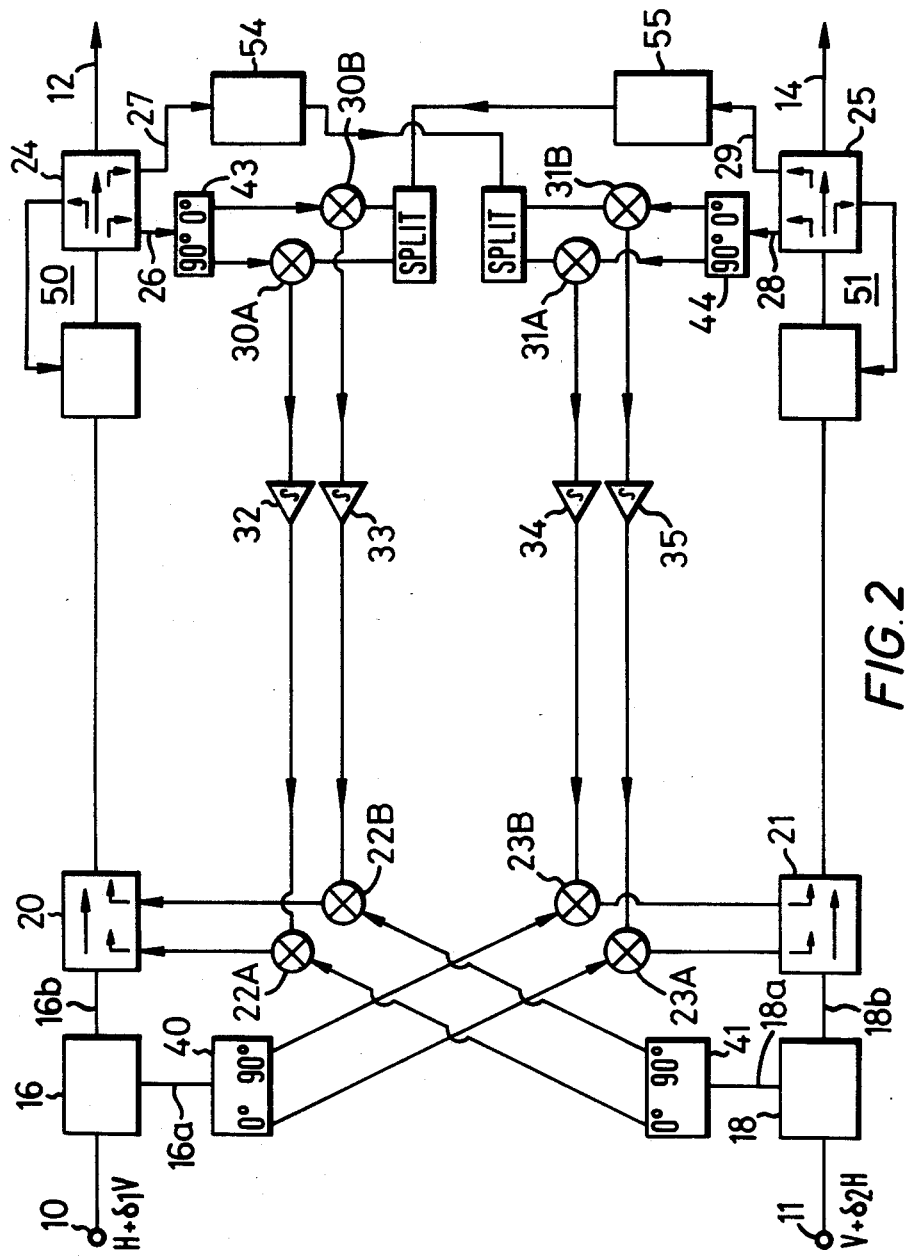
FIG. 2 is a block schematic diagram showing in more detail a canceller of the form illustrated in FIG. 1.

A more detailed version of the canceller described with reference to FIG. 1 is shown in FIG. 2. The signal 16a from splitter 16 is applied to a quadrature hybrid 40 which split the signal into two equal parts which differ in phase by 90°. Similarly the signal 18a from splitter 18 is split by a quadrature hybrid 41 into two equal parts which differ in phase by 90°. Double balanced mixers 22A, 22B and 23A, 23B multiply these signals with control signals output from complex correlators 30 and 31 respectively. The signal output from double balanced mixers 22A, 22B and 23A, 23B are combined with signals 16b and 18b output from splitters 16 and 18 in combining circuits 20 and 21. The effect is to adjust the signals 16a and 18a output from splitters 16 and 18 respectively in both amplitude and phase so that when added to the signal 18b and 16b in combining circuits 21 and 20 respectively the interfering signals $\delta_2 H$ and $\delta_1 V$ are substantially reduced.

In the complex correlator the signal output from splitter 24 is split into two equal parts which differ in phase by 90° in a quadrature hybrid 43. The two signals are applied to double balanced mixers 30A and 30B which multiply these with signal 29 obtained from splitter 25. Signals 27, 29 may pass through their respective limiters 54, 55 in order to suppress any interference present in the outputs 12, 14, which would cause errors in the control signals to the complex attenuators. However, since signals 27, 29 are used to switch the double balanced mixers, the presence of a small interfering signal can have little effect and render the use of limiters unnecessary.

Signals output from double balanced mixers 30A and 30B are integrated in operational amplifiers 32, 33 to produce control signals for the complex attenuator 22. A similar arrangement comprises signal 28 output from splitter 25, signal 27 output from splitter 24, splitter 44, double balanced mixers 31A, 31B and operational amplifiers 34, 35 to provide control signals for the complex attenuator 23.

It will also be seen that in the arrangement of FIG. 2 the path for the signal H includes an automatic gain control (AGC) circuit designated generally at 50 for controlling and maintaining constant the output level from the splitter 24. The path for the signal V includes a similar AGC circuit 51 for controlling and maintaining constant the level of the output from the splitter 25.

It is known to make use of complex correlators which comprise simple double balanced mixers. These double balanced mixers correlate a higher level signal with a low level signal. Imperfections in the double balanced mixer give rise to a DC offset voltage at the output which is related to the high level input signal. This DC offset voltage will cause an error in the control signal to the complex attenuator and will reduce the efficacy of the cancellation process. Thus, we have designed an improved correlating circuit which is intended to overcome this problem. The improved correlating circuit is illustrated in FIG. 3 of the drawings.

Referring to FIG. 3 the improved correlator comprises a modulating stage which is constituted by a double balanced mixer 60. The double balanced mixer 60 is a three port device having an input 61 which receives the low level signal which is to be correlated, an input 62 which receives a square wave 500 KHz signal from an oscillator 63 and an output 63. The output signal at the output 64 is the low level signal to be correlated amplitude modulated by the 500 KHz oscillator signal. This signal is applied to an input 65 of a second double balanced mixer 66 which also receives a high level correlating signal at input 68. The mixer 66 multiplies the signal at input 65 with the high level signal at input 68 and produces at output 69 a 500 KHz signal which is fed via suitable a.c. coupling which includes an amplifier to a third double balanced mixer 70. The double balanced mixer 70 receives the 500 KHz square wave output of the oscillator 63 at input 71 and operates to demodulate the input from the mixer 66 to produce a d.c. signal at output 72. This d.c. output is the correlation signal and is fed via an integrator in the form of a chopper stabilised amplifier 73 and used as the control signal for the mixers 23 and 23 as described earlier.

The circuit shown in FIG. 3 effectively frequency converts the signals to be correlated to a lower frequency and this reduces considerably the problem produced by leakage of the high level signal to the low level signal.

The circuit described above has been designed to operate with incoming signals having frequencies of the order of 140 MHz although it will be appreciated that the principle of the present invention could be applied over a very wide range of frequencies.

Also the invention can be used to cancel unwanted components in more than two input signals.

What is claimed is:

1. A multi-channel circuit for reducing cross-talk interference between signals passing along plural channels, said multi-channel circuit comprising:

plural signal processing channels, each channel having (a) an input (10, 11), (b) a first signal splitter (16, 18) connected to said input and providing at least two replicas (16a–16b, 18a–18b) of signals input thereto, (c) a signal combiner (20, 21) connected to combine one of the split replica signals from its own channel (16b, 18b) with a feedback signal provided from a different channel, and (d) a second signal splitter (24, 25) connected to receive the combined output of the signal combiner, to provide plural replicas (26–27, 28–29) of such combined signals and also to provide an output replica (12, 14) thereof;

each channel also including a signal correlator (30, 31) receiving a replica signal (26–29, 28–27) from the second signal splitter of each said processing channel and providing a control signal representing the degree of correlation therebetween;

each channel also including at least one controlled attenuator (22, 23) receiving a replica signal (18a, 16a) from the first signal splitter in a different channel and providing an attenuated version thereof as said feedback signal to its signal combiner, the degree of attenuation being determined by the control signal provided by the correlator in that same channel; and wherein said correlator includes a signal multiplier feeding an integrator, each said multiplier having (a) a signal modulator, (b) a multiplier, and (c) a demodulator.

2. An electrical circuit for receiving plural input signals each of which includes an unwanted component of at least one other of the input signals, the circuit being arranged to cancel or substantially reduce said components in a processed output version of each said signal, said circuit including:

a first input coupled by a first circuit path for processing a first of said input signals to a first output, a second input coupled by a second circuit path for processing a second input signal to a second output, a feedback loop associated with each said circuit path, each feedback loop having a further circuit and also having correlation means arranged to receive signals from each said output and to provide a control signal therefrom which is fed to said further circuit, said first circuit being responsive to said control signal to feed to its associated circuit path a signal which tends to cancel said unwanted component therein, wherein each correlation means comprises a multiplying means followed by an integrator, said multiplying means comprising modulation means for modulating a first of the signals to be correlated with a preselected signal, a multiplier for multiplying the modulated signal with the second of the signals to be correlated, and demodulated means for demodulating the multiplied signal.

3. An electrical circuit as in claim 2 wherein each said further circuit comprises a complex attenuator which is arranged to receive a fraction of the signal received at the input associated with another feedback loop and to adjust the magnitude and phase of this signal so as to cancel said unwanted component.

4. An electrical circuit as in claim 2 wherein the integrator comprises a chopper stabilized amplifier.

5. An electrical circuit as in claim 2 wherein each circuit path includes an automatic gain control circuit for stabilizing the level of the signal strength at its own output.

6. An electrical circuit as in claim 2 wherein each said circuit path includes: a combining circuit, and a splitting circuit for splitting signals received at each input into two parts, one of which parts is fed to the combining circuit and the other of which parts is fed to the correlation means of a different one of said feedback loops.

7. A circuit as in claim 6 wherein each said combining circuit in a given circuit path is arranged to receive the output signal of the complex attenuator in the same circuit path and to combine that output signal with the signal received from the splitting circuit of a different circuit path.

8. An electrical circuit as in claim 7 wherein each circuit path includes a second splitting circuit arranged to receive output signals from the combining circuit with that same circuit path, said second splitting circuit being arranged to produce output signals for feeding to the correlation means of each feedback loop.

9. An interference reducing circuit for receiving first and second input signals each of which includes an unwanted component of the other, the circuit being arranged to cancel or substantially reduce said unwanted components in respectively corresponding first and second output signals, the interference reducing circuit comprising:

a first input for receiving a first input signal;

a second input for receiving a second input signal;

first and second outputs for providing first and second processed output signals respectively corresponding to said first and second input signals but having reduced amounts of said unwanted components therewithin;

a first circuit path coupled between the first input and the first output;

a second circuit path coupled between the second input and the second output;

first correlation means arranged to receive fractions of both output signals and to provide a control signal to a first cancelling loop associated with said first circuit path, said first cancelling loop being operative in accordance with the control signal to feed to the first circuit path a signal that tends to cancel its unwanted component;

second correlation means arranged to receive fractions of both output signals and to provide a control signal to a second cancelling loop associated with said second circuit path, said second cancelling loop being operative in accordance with the control signal to feed to the second path a signal which tends to cancel its unwanted component;

wherein each correlation means comprises a multiplying means followed by an integrator, said multiplying means comprising modulation means for modulating one of the signals to be correlated with a preselected signal, a multiplier for multiplying the modulating signal with the other of the signals to be correlated, and demodulating means for demodulating the modulated signal.

10. An interference reducing circuit as in claim 9 wherein each said circuit path includes an automatic gain control circuit for stabilizing the level of the signal strength at the output of its own respective circuit path.

11. An interference reducing circuit as in claim 9 wherein each integrator comprises a chopper stabilized amplifier.

12. An interference reducing circuit as in claim 9 wherein:
   the first cancelling loop comprises a complex attenuator which is arranged to receive a fraction of the signal received at the second input and to adjust the magnitude and phase of this signal so as to cancel the unwanted component in the first input signal, and
   the second cancelling loop comprises a complex attenuator which is arranged to receive a fraction of the signal received at the first input and to adjust the magnitude and phase of this signal so as to cancel the unwanted component in the second input signal.

13. An interference reducing circuit as in claim 12 wherein each circuit path includes a splitting circuit for splitting a received signal into two parts, one of which parts is fed to the combining circuit of its own respective circuit path and the other of which parts is fed to the combining circuit associated with the other of said circuit paths.

14. An interference reducing circuit as in claim 13 wherein the combining circuit of each circuit path is arranged to receive the output signal of the complex attenuator associated with that same circuit path and to combine the output signal with the signal received from the splitting circuit associated with that same circuit path.

15. An interference reducing circuit as in claim 14 wherein each said circuit path includes a second splitting circuit arranged to receive output signals from the combining circuit of that same respective circuit path, said second splitting circuit being arranged to produce output signals for feeding to both said correlation means.

* * * * *